United States Patent [19]

Taul

[11] 4,136,985

[45] Jan. 30, 1979

[54] CORNER STRUCTURE

[75] Inventor: Niels A. Taul, Kokkedal, Denmark

[73] Assignee: Massey-Ferguson Inc., Detroit, Mich.

[21] Appl. No.: 813,574

[22] Filed: Jul. 7, 1977

[51] Int. Cl.² ............................................. B60R 21/00
[52] U.S. Cl. .................................... 403/172; 403/218; 296/102; 280/756
[58] Field of Search ............... 403/171, 172, 176, 217, 403/218, 219, 205, 403; 296/102; 280/756

[56] References Cited

U.S. PATENT DOCUMENTS 1,588,268  6/1926  Roche .................................. 403/171

FOREIGN PATENT DOCUMENTS 671520  9/1929  France ..................................... 403/171
744294  2/1956  United Kingdom ..................... 403/171

Primary Examiner—Andrew V. Kundrat
Attorney, Agent, or Firm—William R. Nolte

[57] ABSTRACT

A fabricated corner structure having a single piece outer member and two piece inner member construction for receiving tubular members generally perpendicular to each other encompassed by the inner and outer members with a vertical support member perpendicular to the tubular members welded to the outer member. The three tubular members form the corner of a ROPS structure.

10 Claims, 5 Drawing Figures

CORNER STRUCTURE

Most failures experienced in roll over protective structures for vehicles constructed from tubing occur at the corners thereof where the ends of the tubes are joined together. The addition of stiff gussets to such corners was of some help but many failures still occurred where tubes pulled away from the gussets or gussets punctured the tubes. As a result corner structures have become very heavy in their structure often times being cast members that are insertable within tube members and usually the entire assembly is required to be welded together, particularly at the corner structure.

Fabricated insertable corner structures exist in the furniture art and fabricated corner structures exist in unrelated art such as the fabricated sheet metal corner structures for backyard swing sets of a tubular construction both of which would not be of satisfactory strength for the present application.

The present invention relates to roll over protective structures for vehicles and more particularly to the corner construction for such protective structures. The corner structure is one having three members in the form of tubes coming together to form a corner structure for slidably receiving the tubular members therein. There is a fabricated outer member for receiving the corner members and two fabricated inner members of an L shape. A face on the outer member adjoins the corner members received by the outer member. A first extension on the outer member extends generally perpendicularly outwardly from the face thereof and a second extension generally perpendicular to the face and the first extension also extends outwardly from the face. The extensions of the outer member adjoin and are fixedly attached to a third corner member. The inner member has a first leg spaced from and parallel to the outer member face and a second leg generally perpendicular to the first leg and parallel to and spaced from the outer member first extension. The legs of the inner member are fixedly attached to the outer member face and first extension respectively and together with the outer member encompass the first two corner members. Fastening means such as bolts are used to fasten the first two corner members to the corner structure by passing through both the corner members and the corner structure. Preferably the fastening means pass through both the inner and outer members of the corner structure as well as the corner members.

The present corner structure is one which even though being fabricated has been found satisfactory to withstand the severe loadings applied to roll over protective structures while at the same time being simple and inexpensive in design. Thus, the fabricated corner structure consists of only three pieces two of which are identical. Another advantage of the structure is that it is capable of being taken apart and therefore in the contrary sense easily field assembled. Further the structure is one which provides expanded surface contact on the corner members to thereby increase the strength of the structure. The fasteners for connecting the corner members to the corner structure are separated due to the expanded contact surface to better distribute stresses on the corner structure. The corner structure provides alternate fastener attachment patterns for otherwise identical components to permit location of fasteners close to the support member for the corner structure.

The result of the above structure is a lightweight simple inexpensive corner structure design which is capable of being dissembled as well as broken down into components for shipping and ready assembly in the field.

The objects and advantages of the structure will become readily apparent to one skilled in the art from reading the following detailed description of an embodiment of the invention when considered in light of the accompanying drawings in which.

Figure 1:
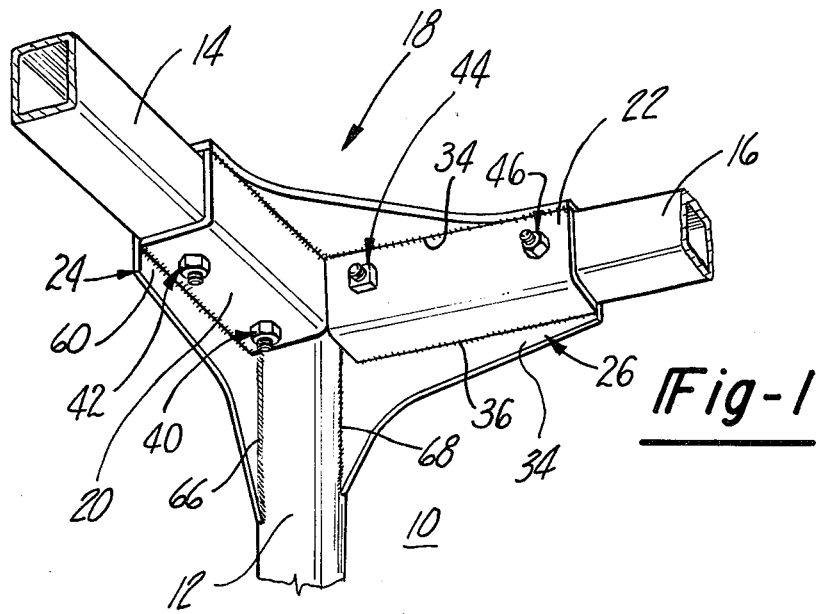
FIG. 1 is a perspective view of a roll over protective structure embodying the present invention.

Referring to the drawings and in particular to FIG. 1 there is disclosed a ROPS corner structure 10 with three corner members. The vertical tubular member 12 supports the corner structure which slidingly receives the remaining corner members 14 and 16. The corner structure has an outer member in the form of a fabricated shaped plate 18 which in conjunction with a pair of inner members in the form of L shaped plates 20 and 22 make up the corner structure 10.

The corner tubes are of a square cross section but other sections could be used and it is to be appreciated that the corner structure would be useful for solid corner members as well. The outer plate 18 and inner plates 20 and 22 would have to be conformed to the shape of the corner members where they take a different shape. However, the square shape of the corner members is particularly suited to the present corner structure 10 in that it results in the inner plate pieces 20 and 22 being identical and further simplifies the fabrication of the plate 18 due to the simple shape of the corner members 14 and 16.

Figure 2:
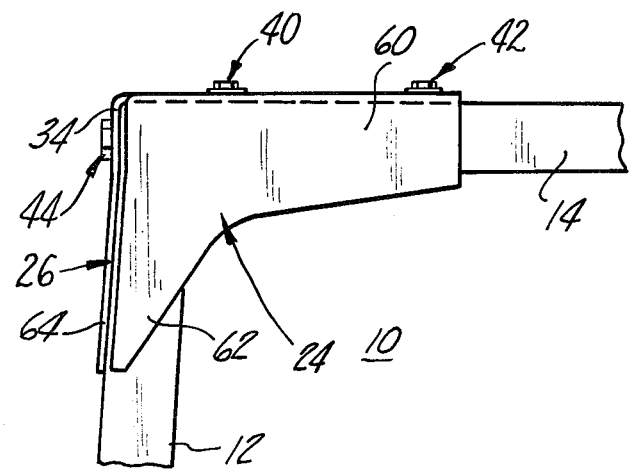
FIG. 2 is a front elevational view of the structure of FIG. 1.
Figure 3:
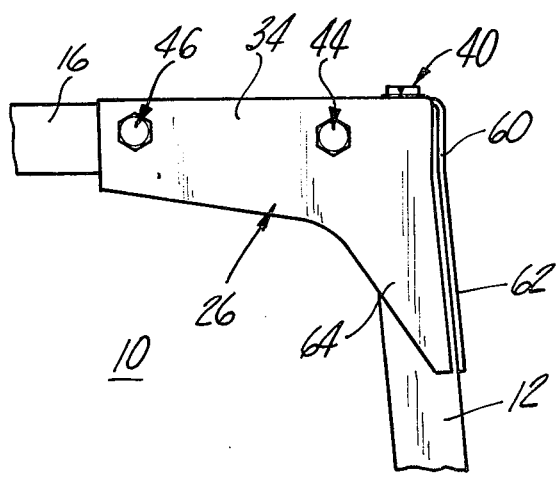
FIG. 3 is a side view of the structure of FIG. 2.
Figure 4:
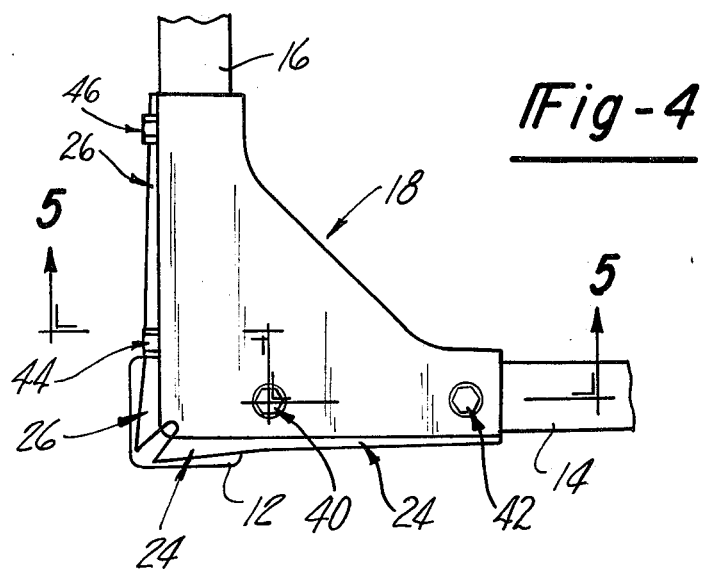
FIG. 4 is a plan view of the structure of FIG. 2.

Thus, it can be seen in FIGS. 2 and 3 that the shape of the extensions of plate 18, plates 24 and 26 are generally identical. In FIG. 4 the plate portions 24 and 26 can be seen to flare out slightly from a vertical position. Thus, the support tube 12 may be laid adjacent both plate portions 24 and 26 at an angle other than the vertical where desired. Clearly the plate portions 24 and 26 could be vertical as well where the support tubing 12 was required or desired to be vertical as well. The outer plate member 18 being a fabricated member, is readily adapted to such minor changes.

Figure 5:
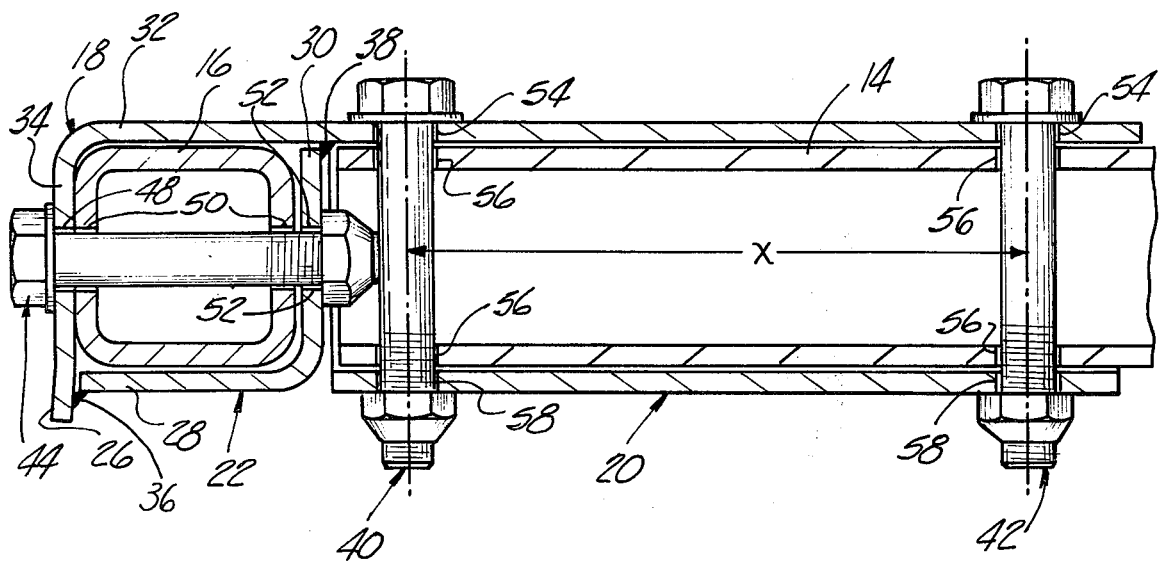
FIG. 5 is a cross-sectional view along line 5—5 of FIG. 4.

FIG. 5 illustrates how the tubes 14 and 16 nest within the outer plate 18 and inner plates 20 and 22. The inner plate 22 can be seen to have legs 28 and 30 which are parallel to a face 32 and upper portion 34 of extension 26 respectively. The legs 28 and 30 can be seen to be welded to the outer plate 18 at points 36 and 38 respectively which welds are continuous over the length of each leg.

An identical construction applies to tubular member 14 and the inner plate 20 therefore. The fastening means for retaining the corner members, tubes 14 and 16, within the corner structure 10 are bolt assemblies 40 and 42 for tube 14 and assemblies 44 and 46 for the tube 16 with only assembly 44 illustrated in FIG. 5.

The upper portion 34 of the outer member 18 and the length of the inner plates 22 and 20 provide a large adjacent mating surface between the corner structure and the corner members, tubes 14 and 16, to obtain the necessary strength for the structure 10. Further, the large contact area permits the distance X between the fasteners for the corner members, tubes 14 and 16, to be maximized to thereby distribute the stresses received by the corner structure 10 from the tubes 14 and 16.

The bolt assemblies 40-46 can be seen to pass through the outer plate 18 the corner members tubes 14 and pattern of the bolts 40, 42 for tube 14 relative to bolts 44, 46 for tube 16 permits the placement of bolts 40 and 44 adjacent inner plates 20 and 22 to provide a tie between all the members of the structure. Apertures 48-58 are provided in the above members for receiving the bolt assemblies.

The bolt pattern for tubes 16 can be seen to be horizontal while that for tube 14 is vertical. Alternating the patternand 44 adjacent to the corner of the corner structure 10 which receives the support tube 12 to reduce effective moment arms for the tubes 14 and 16 and thereby enhance the strength of the corner structue 10.

As can best be seen in FIGS. 1-3 the extending portion, plate 24, has an upper portion 60 identical to that upper portion 34 described for extending portion, plate 26, of the outer plate 18. Both extending portions, plates 24 and 26, have lower portions 62 and 64 respectively which extend along the vertical tube 12 and are welded thereto at 66 and 68 as seen in FIG. 1.

It will be appreciated that removal of the bolt assemblies 40-46 will permit the tubes 14 and 16 to be slid from within the outer plate 18 and inner plates 20 and 22 respectively to thereby permit the structure 10 to be broken down for shipping purposes. At the same time, the bolt assemblies 40-46 permit assembly of the structure 10 in the field since all the welding for the corner structure 10 can be done on the single vertical tube member 12.

Further, it will be appreciated that the length of the sockets provided for the tubes 14 and 16 by the outer and inner plates 18, 20, 22 aid in the assemblying of the protective structure by providing alignment for the tubes 14 and 16 when attempting to insert the bolt assemblies 40-46.

In accordance with the provisions of the patent statutes the principle and mode of operation of the structure have been explained and what is considered to represent its best embodiment has been illustrated and described. It should, however, be understood that this invention may be practiced otherwise than as specifically illustrated and described without departing from its spirit or scope.

I claim:

1. A corner structure for a vehicle roll over protective structure having three members coming together to form a corner thereof for slidably receiving at least one member therein comprising: an outer member for receiving the corner members, at least one inner member, an unbroken face on said outer member adjoining at least one corner member, a first extension on said outer member extending generally perpendicularly outwardly from said face and a second extension generally perpendicular to said face and first extension, said second extension extending outwardly from said face, said first and second extension adjoining and being nondetachably affixed to a second corner member to form a common unbroken surface for the entire surface of said outer member, a first leg on said inner member spaced from and parallel to said outer member face, a second leg on said inner member generally perpendicular to said first leg and parallel to and spaced from said outer member first extension, said first and second inner legs nondetachably affixed to and abutting said outer member face and first extension, respectively, and together therewith encompassing said one corner member, said inner member having a length extending over most of the length common to both said one corner member and outer member first extension and means fastening said one corner member to said corner structure by passing through both said structures.

2. The corner structure defined in claim 1 wherein said outer member is formed from a single plate.

3. The corner structure defined in claim 1 wherein said inner member is L shaped.

4. The corner structure defined in claim 1 wherein said fastening means includes a pair of bolt assemblies spaced from each other over the length of said inner member.

5. The corner structure defined in claim 1 including a second inner member for encompassing a third corner member generally perpendicular to the first and second corner members and adjoining said face of said outer member.

6. The corner structure defined in claim 5 wherein said second inner member includes a first leg spaced from and parallel to said outer member face and a second leg on said inner member generally perpendicular to said second inner member first leg and parallel to and spaced from said outer member second extension.

7. The corner structure defined in claim 5 wherein said outer member extensions have extended upper and lower portions said length of said upper portions matched by the length of said first and second inner members, said lower portions being fixedly attached to the second corner member.

8. The corner structure defined in claim 5 wherein said fastening means includes bolt assemblies for each of said inner members, respectively, in planes perpendicular to each other, one plane passing through said outer member extension and inner member second leg and the other plane passing through said outer member face and other inner member first leg to provide alternating bolt patterns for said corner structure.

9. The corner structure defined in claim 7 wherein said outer member face extends outwardly at right angles along said inner members to match the length thereof.

10. The corner structure defined in claim 9 wherein said inner members are L shaped and said outer plate extensions form L shapes with said outer plate face, said inner and outer members forming a socket of square cross section for receiving square tubing corner members.

* * * * *